United States Patent [19]

Yip

[11] Patent Number: 5,005,243

[45] Date of Patent: Apr. 9, 1991

[54] SEAT REMOVAL TOOL FOR AIRPLANE PASSENGER SEATS

[75] Inventor: Benjamin Yip, Seattle, Wash.

[73] Assignee: The Boeing Company, Seattle, Wash.

[21] Appl. No.: 98,575

[22] Filed: Sep. 18, 1987

[51] Int. Cl.[5] .............................................. B66F 15/00
[52] U.S. Cl. ....................................... 7/166; 254/131
[58] Field of Search ...................... 7/158, 166; 81/437; 254/27, 131

[56] References Cited

U.S. PATENT DOCUMENTS

| | | | |
|---|---|---|---|
| 140,371 | 7/1873 | Jackson | 254/27 |
| 357,644 | 2/1887 | Tucker | 7/166 |
| 372,444 | 11/1887 | Allen | 7/166 |
| 643,512 | 2/1900 | Lubbock | 254/27 |
| 2,688,266 | 9/1954 | Knudsen et al. | 7/166 |
| 3,134,574 | 5/1964 | Reuterfors | 7/166 |
| 3,537,685 | 11/1970 | Gregory | 254/131 |
| 4,089,077 | 5/1978 | Morton | 7/138 |
| 4,580,469 | 4/1986 | Lordahl | 81/437 |

Primary Examiner—James G. Smith
Attorney, Agent, or Firm—P. C. Cullom, Jr.; B. A. Donahue

[57] ABSTRACT

A seat removal tool (20) for airplane passenger seats which consists of: (a) a tool body (38) having: an elongated handle portion (26) adapted to be gripped by a user's hand; an elongated blade portion (28) extending longitudinally forward from the handle portion (26) and having an upturned tip (76) at its distal end; and an aft portion (30) having an Allen wrench (54) extending longitudinally rearward from the handle portion (26) and an arcuate portion (58) having a tooth (56) at its distal end; and (b) a cylindrical plug (34) for positioning the blade portion (28) in the seat track (22), the cylindrical plug (34) being pivotally connected to the blade portion (28) near its distal end. A second seat removal tool (80) which consists of: (a) a tool body (84) having: an elongated handle portion (82) adapted to be gripped by a user's hand; and an elongated blade portion (28') extending longitudinally forward from the handle portion (82) and having an upturned tip (76') at its distal end; and (b) a cylindrical plug (34') for positioning the blade portion (28') in the seat track (22), the cylindrical plug (34') being pivotally connected to the blade portion (28') near its distal end.

8 Claims, 2 Drawing Sheets

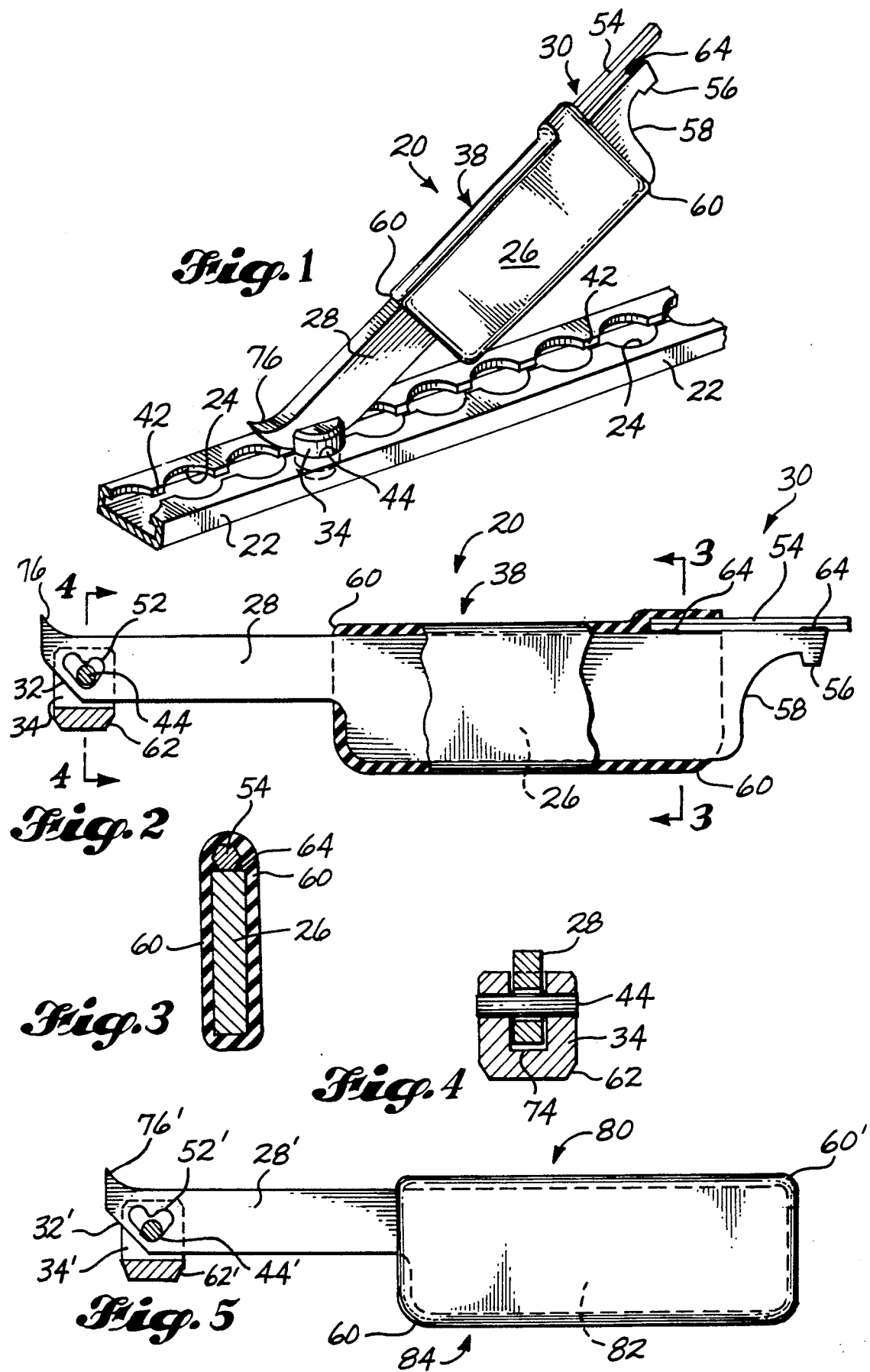

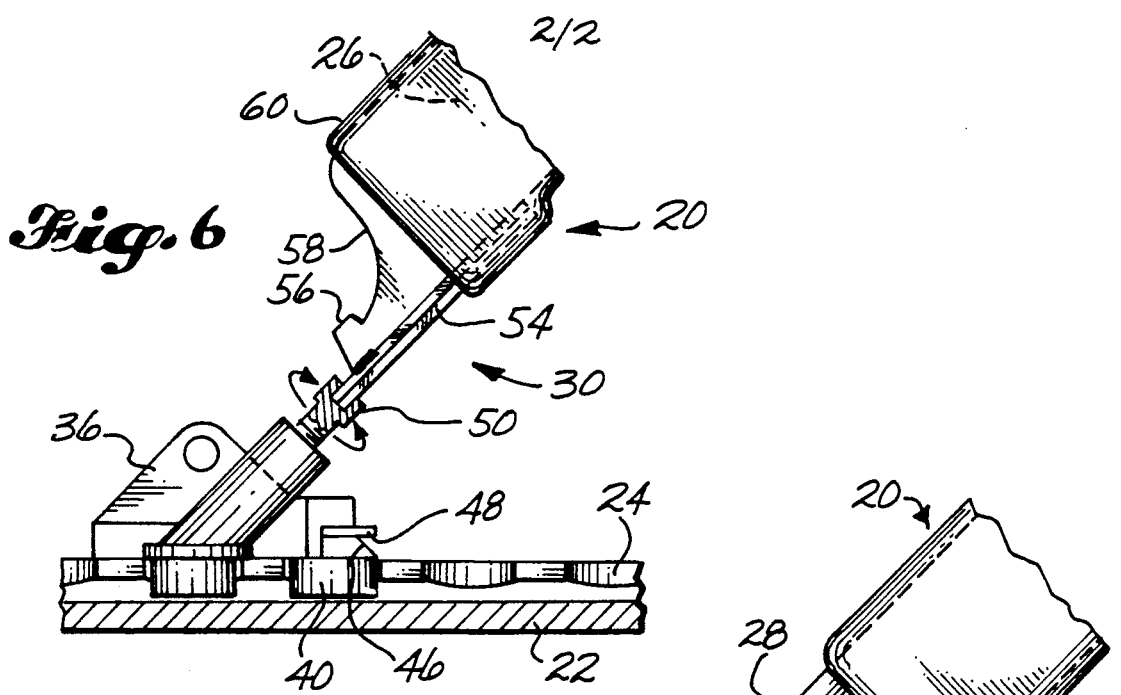
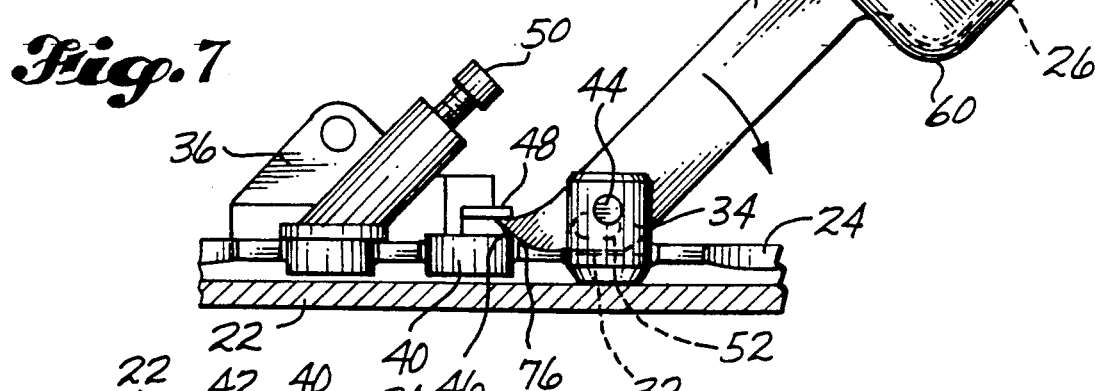
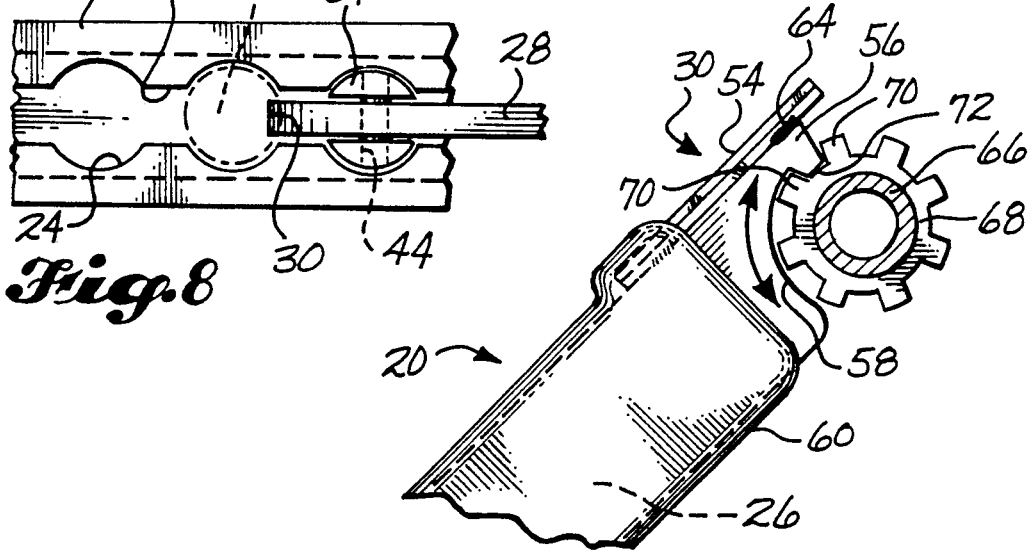

SEAT REMOVAL TOOL FOR AIRPLANE PASSENGER SEATS

BACKGROUND OF THE INVENTION (1) Field of the Invention

The invention is in the field of tools which are used in the removal of airplane passenger seats and the like from seat tracks which are typically mounted in the floor of an airplane. The invention is also in the field of tools which are used in the installation of passenger seats and the like in the seat tracks.

(2) Description of the Related Art

Passenger seats and the like are held in place in many commercial airplanes by being locked into seat tracks which are typically mounted in the floor of the airplane. In many instances, such as when the airplane is being converted from a passenger-carrying aircraft into a freight-carrying aircraft, it is desired to remove some or all of the seats.

The present method of unlocking the passenger seats, practiced by airline companies throughout the world, is by prying up on the seat locking plug (which is part of the aft seat locking mechanism) using a conventional flat-blade screwdriver and a hammer. This crude method often damages the seat track and/or the aft seat locking mechanism. As a result of the damage, the seat may become unremovable, thus creating a significant problem for the airline.

SUMMARY OF THE INVENTION

My invention is a compact multi-function tool used in removing and installing airplane passenger seats. In removing seats, my tool easily unlocks the aft seat locking mechanism by lifting up and releasing the aft seat locking plug. In performing this function, my tool is operated with one hand by a single downward stroke. It will not damage the seat track or the aft seat locking mechanism, thus avoiding the significant problem described above. My invention fills a long-felt need in the airline industry.

One embodiment of my tool consists of: (a) a tool body having: (1) an elongated handle portion adapted to be gripped by a user's hand; and (2) an elongated blade portion extending longitudinally from the handle portion and having an upturned tip at its distal end; and (b) a component for positioning the blade portion in the seat track, the positioning component being pivotally connected to the blade portion near its distal end.

Another embodiment of my tool used in removing airplane passenger seats and the like from a seat track, includes: (a) a tool body having: (1) an elongated handle adapted to be gripped by a user's hand; (2) an elongated blade portion extending longitudinally forward from the handle portion and having an upturned tip at its distal end; and (3) an aft portion having an Allen wrench extending longitudinally rearward from the handle portion and an arcuate portion having a tooth at its distal end; and (b) a component for positioning the blade portion in the seat track, the positioning component being pivotally connected to the blade portion near its distal end.

BRIEF DESCRIPTION OF THE DRAWINGS

FIG. 1 is a perspective view of a first embodiment of my seat removal tool showing the tool positioned in one of the circular openings in a conventional seat track used in many airplanes.

FIG. 2 is a side elevational view of the tool of FIG. 1 with the cylindrical positioning plug shown in vertical section and fragments of the resilient synthetic resin material on the handle cut away in vertical section.

FIG. 3 is a vertical sectional view taken along line 3—3 of FIG. 2.

FIG. 4 is a vertical sectional view taken along line 4—4 of FIG. 2.

FIG. 5 is a side elevational view of a second embodiment of my seat removal tool. The cylindrical positioning plug is shown in vertical section. The phantom lines indicate the metal handle under the resilient synthetic resin material on the handle. The second embodiment shown in FIG. 5 is a simplified version of the first embodiment shown in FIG. 1.

FIG. 6 is a side elevational view of a conventional aft seat locking mechanism in a seat track and the aft portion of my seat removal tool of FIG. 1 showing the Allen wrench portion of my tool engaging the anti-rattle socket head cap screw. The bidirectional arrow indicates that the tool is rotated in one direction to tighten the cap screw (when installing the seat) and in the opposite direction to loosen the cap screw (when removing the seat). The seat track and a fragment of the socket head cap screw are shown in vertical section. The aft leg of the seat has been omitted to simplify the drawing.

FIG. 7 is a side elevational view of a conventional aft seat locking mechanism in a seat track showing my seat removal tool in position to lift up the aft seat locking plug and thereby unlock the aft seat locking mechanism for removal of the seat from the seat track. The seat track is shown in vertical section. The arrow indicates the direction of travel of the tool when unlocking the seat locking plug.

FIG. 8 is a plan view of the seat track, the aft seat locking plug, and the forward blade portion of my seat removal tool. The tool is shown in position to lift up the aft seat locking plug, which is shown in phantom. The other parts of the aft seat locking mechanism have been omitted to simplify the drawing.

FIG. 9 is a plan view of a conventional forward seat locking ring (part of the forward seat locking mechanism) and the aft portion of my seat removal tool of FIG. 1 engaging the forward seat locking ring, which is mounted horizontally on the bottom of a front leg of a seat. The front leg of the seat is shown in horizontal section. The bidirectional arrow indicates that the tool is used in one direction of rotation to tighten the locking ring (when installing the seat) and in the opposite direction of rotation to loosen the locking ring (when removing the seat). The seat track has been omitted to simplify the drawing.

DESCRIPTION OF THE PREFERRED EMBODIMENTS

Two embodiments of my seat removal and installation tool for airplane passenger seats and the like will be described. Referring to the drawings, FIGS. 1 and 2 show the first embodiment (tool 20) and FIG. 5 shows the second embodiment (tool 80).

FIG. 1 shows tool 20 with cylindrical positioning plug 34 in circular hole 24 in empty seat track 22 for purposes of illustrating how cylindrical plug 34 slip fits into circular hole 24 in the upper face of track 22. Seat track 22 is conventional and forms no part of my invention. Typically, the legs of passenger seats are locked into parallel seat tracks 22 which run longitudinally in the airplane cabin and which are mounted in the floor of the airplane.

The passenger seats are attached to seat track 22 by aft seat locking mechanism 36 as shown in FIGS. 6 and 7 located at the bottom of an aft leg of the seat and by a forward locking mechanism located at the bottom of forward leg 66 of the seat as shown in part in FIG. 9. To simplify FIGS. 6 and 7, the aft seat leg has not been shown, but it would extend vertically from aft seat locking mechanism 36. To simplify FIG. 9, only the locking ring 68 portion of the forward seat locking mechanism has been shown. The forward and aft seat locking mechanisms are conventional and form no part of my invention.

In FIG. 2, it will be seen that tool body 38 of tool 20 consists of elongated forward blade portion 28, elongated handle portion 26 (where the human user grips the tool with his hand), and aft portion 30 (which performs two functions). Blade portion 28 extends longitudinally forward from handle portion 26. The distal end of blade portion 28 has upturned tip 76 for lifting up seat aft locking plug 40 as shown in FIG. 7.

Seat track 22 has channel 42 which extends longitudinally interconnecting the row of circular holes 24. In use, the front of blade portion 28 fits inside channel 42 as shown in FIG. 7, thus the width of blade portion 28 must be less than the width of channel 42. FIGS. 2 and 7 show that blade portion 28 has a flat frontal area 32 to provide operating clearance with respect to the base of cylindrical positioning plug 34 when blade portion 28 pivots on pin 44 (as shown in FIG. 7).

U-shaped channel 74 (FIG. 4) in cylindrical plug 34 allows plug 34 to have a slip fit relationship with the front of blade portion 28. Plug 34 is retained on blade portion 28 by pin 44 which has a press fit relationship to the sides of plug 34. Pin 44 has a slip fit relationship to L-shaped hole 52 in blade 28. Plug 34, which has beveled lower edge 62 for ease of insertion in circular holes 24, has the function of positioning and supporting blade 28 in seat track 22 for proper operation when lifting up and thereby unlocking aft seat locking plug 40 as shown in FIG. 7. FIG. 7 shows that upturned tip 76 fits into notch 46 in the rear side of locking plug 40. When the user pushes down on handle portion 26, then tip 76 pivots on pin 44 and pushes up against lip 48 of plug 40. This forces plug 40 to move upwardly, thereby unlocking aft seat locking mechanism 36 from seat track 22.

Tool 20 has aft portion 30 which consists of arcuate portion 28, tooth 26, and hexagonal Allen wrench 54 which is brazed or welded to body 38 at locations 64 in FIG. 2. The function of Allen wrench 54 is shown in FIG. 6 which illustrates how it tightens (when installing the seat) or loosens (when removing the seat) the conventional anti-rattle socket head cap screw 50 which is part of aft seat locking mechanism 36. The function of tooth 56 is shown in FIG. 9 which illustrates how tooth 56 tightens (when installing the seat) or loosens (when removing the seat) conventional forward seat locking ring 68 which is part of the forward seat locking mechanism. The radius of arcuate portion 58 is slightly larger than the radius of locking ring 68 so that locking ring 68 fits in arcuate portion 58 when tooth 56 engages notch 72 between teeth 70 in locking ring 68.

It is preferred, but not essential, to make handle portion 26 with a height (from lower edge to upper edge) that is greater than the height of blade portion 28 (as shown in FIGS. 1 and 2) and to cover handle portion 26 with resilient synthetic resin material 60 to provide a comfortable handgrip surface for a user's hand. Material 60 may, for example, be a tough resilient type of plastisol coating material. A preferred plastisol coating is sold under the trademark UNICHROME Compound 218-X by M & T Chemicals Inc. of Rahway, N.J. The durometer reading of cured UNICHROME coating is about 70 (Shore A scale). Material 60 should be tough and durable, providing a covering that will withstand impact, rough handling, nicks, cuts, and scratches. The lower edge of handle 26 covered by material 60 may be used in place of a rubber mallet to pound down aft seat locking plug 40 during seat installation.

The best mode of making my compact tool 20 is to make tool body 38 of steel alloy that is heat treated to Rockwell 38–42, to make cylindrical plug 34 of aluminum alloy, to make tool 20 have a compact length of about eight inches, to make handle portion 26 have a length of about four inches, to make blade portion 28 have a length of about three inches, and to make aft portion 30 have a length of about one inch. A preferred steel alloy for tool body 38 is steel alloy 4340 and a preferred aluminum alloy for cylindrical plug 34 is aluminum alloy 6061-T6.

FIG. 5 shows the second embodiment (tool 80) of my seat removal tool for airplane passenger seats. Tool 80 is a simplified version of tool 20 shown in FIGS. 1 and 2. Components of the two embodiments having the same construction and function have been given the same reference numeral in the drawings, but with an apostrophe (') in the case of the second embodiment.

The primary structural difference between the first and second embodiments is that aft portion 30 of tool 20 (including arcuate portion 58, tooth 56, and Allen wrench 54) has been eliminated in tool 80 (FIG. 5). Thus, tool body 84 of tool 80 consists of elongated forward blade portion 28' and elongated handle portion 82 where the human user grips the tool. Blade portion 28' and cylindrical positioning plug 34' in tool 80 have the same construction and function as in tool 20. Handle portion 82 of tool 80 is similarly covered by resilient synthetic resin material 60', as described above. The lower edge of handle 82 covered by material 60' may be used in place of a rubber mallet to pound down aft seat locking plug 40 during seat installation.

As will be apparent to those skilled in the art to which the invention is addressed, the present invention may be embodied in forms other than those specifically disclosed above without departing from the spirit or essential characteristics of the invention. The particular embodiments of my seat removal tool, as described above, are therefore to be considered in all repects illustrative and not restrictive, with the scope of the present invention being set forth in the appended claims rather than being limited to the foregoing description.

What is claimed is:

1. A tool used in removing airplane passenger seats and the like from a seat track, which comprises:
   (a) a tool body having:
      (1) an elongated handle portion adapted to be gripped by a user's hand; and
      (2) an elongated blade portion extending longitudinally from said handle portion and having an upturned tip at its distal end, said blade portion having an L-shaped hole near its distal end; and
   (b) a cylinder plug means for positioning said blade portion in said seat track, said cylindrical plug means being adapted to fit in said seat track, said cylindrical plug means pivotally supporting said blade portion near its distal end by a single pivot pin connected to said cylindrical plug means, said pivot pin being received by said L-shaped hole in said blade portion and having a slip fit in said L-shaped hole, whereby said pivot pin moves from the forward portion of said L-shaped hole to the rear portion of said L-shaped hole as a user pushes down on said handle portion.

2. A tool as recited in claim 1 wherein said handle portion is covered with a resilient synthetic resin material to provide a comfortable handgrip surface for a user's hand.

3. A tool as recited in claim 2 wherein said resilient synthetic resin material is a plastisol coating material.

4. A tool as recited in claim 1 wherein said tool body is made of steel alloy and wherein said cylindrical plug means is made of aluminum alloy.

5. A tool used in removing airplane passenger seats and the like from a seat track, which comprises:
  (a) a tool body having:
    (1) an elongated handle portion adapted to be gripped by a user's hand;
    (2) an elongated blade portion extending longitudinally forward from said handle portion and having an upturned tip at its distal end, said blade portion having an L-shaped hole near its distal end; and
    (3) an aft portion having an Allen wrench extending longitudinally rearward from said handle portion and an arcuate having a tooth at its distal end; and
  (b) a cylindrical plug means for positioning said blade portion in said seat track, said cylindrical plug means being adapted to fit in said seat track, said cylindrical plug means pivotally supporting said blade portion near its distal end by a single pivot pin connected to said cylindrical plug means, said pivot pin being received by said L-shaped hole in said blade portion and having a slip fit in said L-shaped hole, whereby said pivot pin moves from the forward portion of said L-shaped hole to the rear portion of said L-shaped hole as a user pushes down on said handle portion.

6. A tool as recited in claim 5 wherein said handle portion is covered with a resilient synthetic resin material to provide a comfortable handgrip surface for a user's hand.

7. A tool as recited in claim 6 wherein said resilient synthetic resin material is a plastisol coating material.

8. A tool as recited in claim 3 wherein said tool body is made of steel alloy and wherein said cylindrical plug means is made of aluminum alloy.

* * * * *